(12) United States Patent
Brolin

(10) Patent No.: US 7,990,873 B2
(45) Date of Patent: Aug. 2, 2011

(54) TRAFFIC SHAPING VIA INTERNAL LOOPBACK

(75) Inventor: Stephen J. Brolin, Livingston, NJ (US)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 12/468,150

(22) Filed: May 19, 2009

(65) Prior Publication Data

US 2010/0296396 A1 Nov. 25, 2010

(51) Int. Cl.
*H04L 12/26* (2006.01)
(52) U.S. Cl. ........................ 370/236; 370/230.1; 370/249
(58) Field of Classification Search .................. 370/229, 370/230, 230.1, 235, 237, 249, 357, 359, 370/419
See application file for complete search history.

(56) References Cited

U.S. PATENT DOCUMENTS

| | | | | |
|---|---|---|---|---|
| 5,432,783 A * | 7/1995 | Ahmed et al. | ................. | 370/397 |
| 5,459,724 A * | 10/1995 | Jeffrey et al. | ................. | 370/398 |
| 6,233,236 B1 * | 5/2001 | Nelson et al. | ................. | 370/359 |
| 7,062,568 B1 * | 6/2006 | Senevirathne et al. | ....... | 709/234 |
| 7,796,594 B2 * | 9/2010 | Melman et al. | ................. | 370/389 |
| 2005/0281392 A1 * | 12/2005 | Weeks et al. | ..................... | 379/22 |
| 2006/0008273 A1 * | 1/2006 | Xue et al. | ......................... | 398/51 |
| 2006/0165002 A1 * | 7/2006 | Hicks et al. | .................... | 370/248 |
| 2007/0183415 A1 * | 8/2007 | Fischer et al. | ................ | 370/389 |
| 2008/0137660 A1 * | 6/2008 | Olakangil et al. | ............ | 370/392 |
| 2008/0198746 A1 * | 8/2008 | Kwan et al. | .................... | 370/231 |
| 2009/0135835 A1 * | 5/2009 | Gallatin et al. | ............... | 370/400 |
| 2010/0002715 A1 * | 1/2010 | Pike et al. | ...................... | 370/415 |

* cited by examiner

*Primary Examiner* — Kwang B Yao
*Assistant Examiner* — Nguyen Ngo
(74) *Attorney, Agent, or Firm* — Baker Botts L.L.P.

(57) ABSTRACT

A method for traffic shaping includes receiving traffic from one or more clients at one or more ingress ports of forwarding engine of a network node. The method also includes transmitting at least a portion of the traffic through the forwarding engine to one or more first egress ports of the forwarding engine and shaping the traffic transmitted to the egress ports. Furthermore, the method includes looping the shaped traffic internally within the network node back to one or more ingress ports of the forwarding engine. The method further includes transmitting the looped traffic through the forwarding engine to one or more second egress ports (the second egress ports different than the first egress ports) and outputting the shaped traffic from the network node.

19 Claims, 3 Drawing Sheets

TRAFFIC SHAPING VIA INTERNAL LOOPBACK

TECHNICAL FIELD

This disclosure relates in general to networking systems and more particularly to a method and system for traffic shaping utilizing internal loopback.

OVERVIEW

Some communication devices, such as some Ethernet switches, provide functionality based at least in part on the class of the device. Carrier class devices may provide more functionality for users, typically at a greater cost, while enterprise class devices may provide less functionality, often at a lower cost. Enterprise class devices with lower functionality may be used in applications where greater functionality is desired.

SUMMARY OF EXAMPLE EMBODIMENTS

In accordance with one embodiment of the present disclosure, a method for traffic shaping includes receiving traffic from one or more clients at one or more ingress ports of forwarding engine of a network node. The method also includes transmitting at least a portion of the traffic through the forwarding engine to one or more first egress ports of the forwarding engine and shaping the traffic transmitted to the egress ports. Furthermore, the method includes looping the shaped traffic internally within the network node back to one or more ingress ports of the forwarding engine. The method further includes transmitting the looped traffic through the forwarding engine to one or more second egress ports (the second egress ports different than the first egress ports) and outputting the shaped traffic from the network node.

Numerous technical advantages are provided according to various embodiments of the present disclosure. Particular embodiments of the disclosure may exhibit none, some, or all of the following advantages depending on the implementation. In certain embodiments, traffic shaping may be performed on ingress traffic flows at network nodes that are designed for only egress traffic shaping through the use of internal loopback of traffic. In this manner, traffic can be better managed and available packet descriptors can be increased in certain embodiments.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Some communication devices may provide specific features based on the cost and/or the class of the device. More expensive devices will sometimes have more features than lower cost devices. As one example, some devices may have ingress and egress traffic shaping capabilities, while also providing a relatively large number of descriptors per port. Other devices may be less expensive, and may only provide egress traffic shaping and fewer descriptors per port. In certain embodiments of the present disclosure, a method and system for providing ingress and egress traffic shaping using devices that are originally intended to provide only egress traffic shaping is described. In some embodiments, available packet descriptors for traffic in lower cost devices may be increased.

Some communication devices may provide traffic shaping at one or more ports. Traffic shaping may be used to optimize the performance of the network or provide other services. For example, traffic shaping may lower latency and/or increase usable bandwidth. Traffic shaping may operate by imposing a delay on one or more packets such that they conform to a constraint and may be used to control the volume of traffic in a network over a given time period or the rate at which network traffic is sent. Traffic shaping may also be used to classify traffic into different classes, and prioritize the traffic based at least in part on the classification.

Some devices offer lower functionality in exchange for a lower cost. As one example, some devices may provide ingress traffic shaping in one or more ports and egress traffic shaping in one or more ports. Other devices, often costing less, may only provide egress traffic shaping and not provide ingress traffic shaping. Furthermore, some devices may have more descriptors per egress port than other lower cost devices. An example embodiment of the present disclosure may use internal loopback to provide both ingress traffic shaping and egress traffic shaping using a device that was not designed to provide for traffic shaping on ingress traffic. In some example embodiments of the present disclosure, the number of available packet descriptors for traffic may be increased using such loopback.

Figure 1:
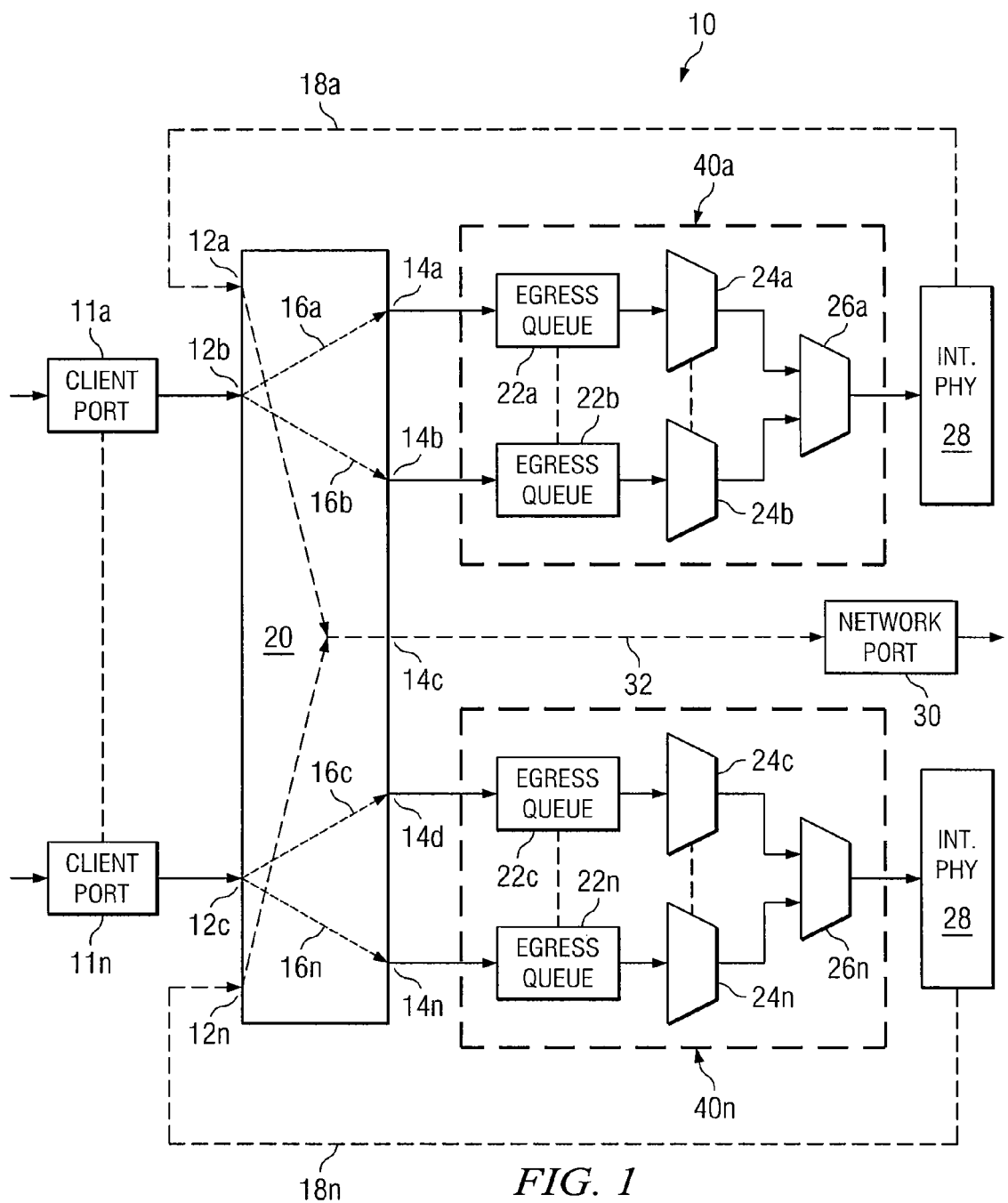
FIG. 1 illustrates an example system for providing traffic shaping via internal loopback of traffic.

FIG. 1 illustrates a network node 10 for providing traffic shaping via internal loopback. Network node 10 may comprise, for example, an Ethernet switch. Network node 10 may be used for providing ingress traffic shaping in a device that does not have built-in ingress traffic shaping, but that does provide traffic shaping for egress traffic.

Network node 10 comprises client ports 11 that communicate traffic to and from client devices coupled to node 10 and one or more network ports 30 (only a single network port is shown for sake of simplicity) that communicate traffic to and from a network to which node 10 is coupled (for example, an Ethernet network). Network node 10 also includes a traffic forwarding engine 20 that includes ingress ports 12 and egress ports 14. Associated with each egress port 14 may be a traffic shaping engine 40 that includes egress queues 22, queue schedulers 24, and port schedulers 26. In this embodiment, various traffic paths are also shown for purposes of explanation. These paths include switching paths 16 in the forwarding engine, loopback paths 18 associated with an internal physical (PHY) layer 28 of the node 10, and a pass-through path 32.

Network node 10 is configured to receive client traffic at one or more client ports 11, forward this traffic to ingress ports 12 of forwarding engine 20, and forward at least a portion of the traffic to unused egress ports 14. The forwarded traffic is then shaped using the shaping engine 40 associated with the egress port 14 to which the traffic was forward and then is looped back via the ingress section of that same port to one or more forwarding engine ingress ports 12 (which may be different ingress ports 12 from the ports at which the unshaped traffic was originally received from client ports 11). During the second pass through node 10, multiple shaped flows from different clients may be aggregated and then forwarded to an egress port 14 associated with a network port 30. The loopback may be done internally using the internal PHY layer 28 of the node 10 such that no additional hardware is required to perform the loopback.

Network node 10 may also be configured to provide descriptors to ingress traffic to keep track of packets. The descriptors may be assigned at an egress port 14 (those egress ports 14 being used for ingress traffic shaping and loopback, hereinafter referred to as "loopback ports," are associated with unused network ports 30). Each loopback port may have a specific number of descriptors that it assigns to packets. By utilizing descriptors at each loopback port rather than just at a network port 30 (as is done in existing nodes), more descriptors may be available for tracking packets.

In one example operation, network node 10 works as follows. Traffic enters the node at one or more client ports 11 and is forwarded to one or more ingress ports 12. In FIG. 1, for example, traffic received at client port 11a is communicated to forwarding engine ingress port 12b and from traffic received at client port 11n is communicated to forwarding engine ingress port 12c. In this example, node 10 is not designed for ingress traffic shaping and thus traffic is communicated directly from a client port 11 to an ingress port 12 of forwarding engine 20 without traffic shaping. However, as mentioned above, ingress traffic shaping may be performed using the shaping engine(s) 40 associated with unused egress ports of forwarding engine 20. To enable ingress traffic shaping, traffic from different client ports 11 may not be combined in forwarding engine 20 (at least initially). However, client ports that are part of the same client's link aggregation group can be combined in forwarding engine 20 and processed as a single flow. Instead, traffic forwarding engine 20 sends traffic received at one or more of its ingress ports 12 to one or more unused egress ports 14 (which are associated with unused network ports 30) which serve as loopback ports in the present embodiment. Any suitable number of ingress ports 12 may receive traffic, and traffic forward engine 20 may send the traffic to any suitable number of egress ports 14. In this example, traffic may travel paths 16 from ingress ports 12 to egress ports 14.

Egress ports 14 in this example switch have traffic shaping and queuing capabilities associated therewith. These capabilities are designed to be used to shape egress traffic, combined traffic from multiple client ports 11, but are used in this case for ingress traffic shaping. The traffic shaping capabilities may be represented by traffic shaping engines 40 as shown in FIG. 1. Any suitable type of traffic shaping or queuing may be performed by shaping engines 40. For example, traffic may be divided into classes to provide differing levels of service for the various classes. Traffic shaping engines 40 may comprise egress queues 22, queue schedulers 24, and port schedulers 26. These components, and other components not shown, may provide traffic shaping or queuing for all or part of the traffic communicated to traffic shaping engine 40. Typically each shaping engine 40 is dedicated to a single client port; however it is possible instead to dedicate only one egress queue to each client port (with round robin or similar scheduling to egress traffic from the multiple queues). This would provide less quality of service differentiation per client port, but would reduce the number of loopback ports required for a given number of client ports.

After appropriately shaping the traffic, traffic shaping engines 40 may communicate the shaped traffic back to forwarding engine 20 via internal PHY layer 28 (as opposed to sending the shaped traffic directly to a network port 30 as might be done with egress traffic shaping). This traffic may now comprise a well-shaped flow after being shaped by traffic shaping engines 40. The traffic may be directed via PHY layer 28 via the ingress section of the same port to a forwarding engine ingress port 12 (such as ingress ports 12a and 12n in the illustrated embodiment). As noted above, forwarding engine egress ports 14 and their associated device egress ports, that loop shaped traffic back to forwarding engine input ports 12 after shaping may be referred to as loopback ports. Traffic from each loopback port may be well shaped by the traffic shaping capabilities of the loopback ports. In this example, one loopback port is shown for each ingress port. However, other ratios of loopback ports to ingress ports may be used in other embodiments.

Looped traffic at forwarding engine ports 12a and 12n may be received by traffic forwarding engine 20. Traffic from multiple loopback ports (received from different client ports 11) may then be combined/aggregated by traffic forwarding engine 20. This combined traffic may then be send to an egress port 14 associated with a network port (as opposed to a forwarding engine egress port 14 associated with a physical loopback port). For example, in the illustrated embodiment, the combined traffic may be communicated to egress port 14c and communicated via pass-through path 32 to network port 30. This traffic may be well-shaped from shaping at the loopback ports, which can reduce traffic congestion. Network node 10 may thus provide improved traffic performance. Optionally, further queues and schedulers can be applied to the aggregated traffic prior to egress on network port 30. Since the traffic flowing towards the network port is already well shaped by the loopback ports, the number of required descriptors at the network port is greatly reduced to an amount that is typically available.

Furthermore, network node 10 may also provide an increased number of packet descriptors. Packet descriptors may be used to keep track of where particular packets are in a queue of a node so that they can be found. In some applications, the number of descriptors needed are as many as the number of packets stored in a queue. Short packets may each require one memory cell, and so the number of descriptors may equal the number of cells used to store packets. Low cost devices, however, may limit the number of descriptors at a particular port. As one example, a single port may access one thousand descriptors. However, there could be up to eight times as many memory cells. Therefore, the network node becomes "descriptor limited." More functional, and thus more expensive, devices may not have this limitation. Memory architecture can therefore be a cause of descriptor limitation. In network node 10 illustrated in FIG. 1, each loopback port may have its own supply of descriptors. These descriptors may be used to track packets instead of the use of a limited number of descriptors at a network port 30. As one example, a network node 10 may have the descriptors of ten loopback ports supporting the traffic of ten client ports, instead of the descriptors of one network port 30 supporting the traffic of the ten client ports.

Figure 2:
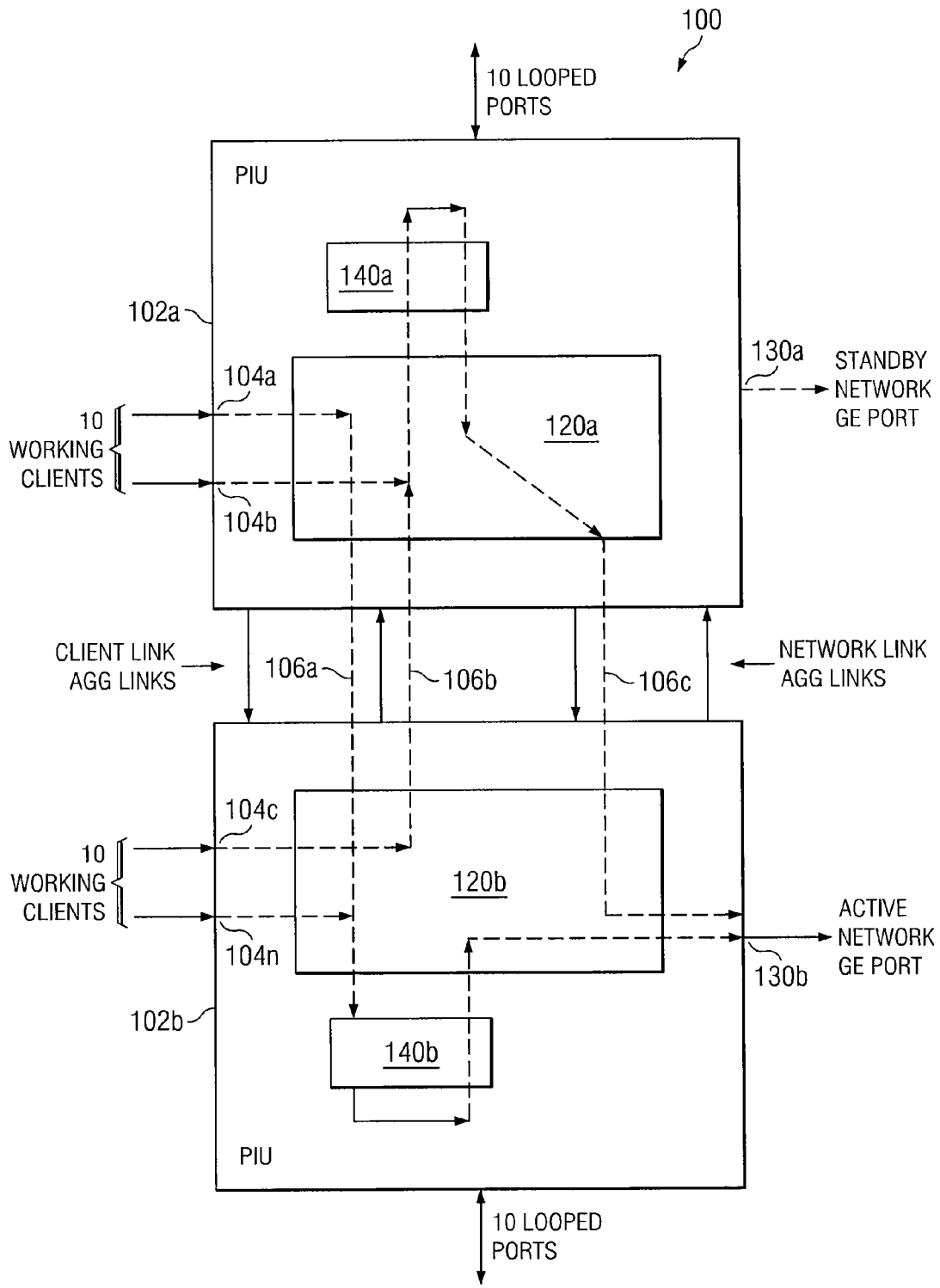
FIG. 2 illustrates another example system for providing traffic shaping via internal loopback of traffic.

FIG. 2 illustrates another example network node 100 for providing traffic shaping through internal loopback. In this embodiment, network node 100 comprises plug-in units ("PIU") 102a and 102b that can be configured to operate in a pair. Plug-in units 102a and 102b may provide networking applications, such as telecommunications or data routing. For example, the paired plug-in units may be used to provide equipment protection/redundancy and/or link aggregation. Plug-in units 102a and 102b may comprise physical interfaces on the front side, the back side, or both to connect to other network components and send signals to and receive signals from such other network components. Plug-in units 102 may comprise any suitable hardware and/or software operable to provide functionality for the system, including any memory, processor, or other components.

Network node 100 further comprises traffic forwarding engines 120a and 120b, which may be similar to engine 20 of FIG. 1. Traffic forwarding engines 120 can send client traffic from one or more client ports 104 to one or more loopback ports with associated traffic shaping engines 140. Any suitable number of client ports 104 may receive traffic, and traffic forwarding engines 120 may send the traffic to any suitable number of loopback ports with associated traffic shaping engines 140. Traffic may also travel any suitable path between plug-in units 102 to facilitate protection and/or link aggregation.

Portions of traffic in network node 100 may be tied together in some embodiments to provide protected interfaces and/or link aggregation. As one example illustrated in FIG. 2, traffic from client port 104a may be combined with or otherwise tied into traffic from client port 104n. Traffic from client port 104a may traverse path 106a from PIU 102a to PIU 102b. Traffic forwarding engine 120b may forward traffic to a loopback port with associated traffic shaping engine 140b, which may be used to shape the combined traffic. Traffic may then be transmitted to traffic forwarding engine 120b where it can be combined with other client traffic, in some embodiments, and then transmitted to an active network port, like active Gigabit Ethernet (GE) network port 130b, for transmission to a network.

As another example, traffic from client port 104c may be combined with traffic from client port 104b, as illustrated in FIG. 2. Traffic from client port 104c may traverse path 106b from PIU 102b to PIU 102a. Traffic forwarding engine 120a may forward traffic to a loopback port with associated traffic shaping engine 140a, which may be used to shape the combined traffic. Traffic may then be transmitted from PIU 102a to PIU 102b via path 106c, where it may be transmitted to an active network port like network port 130b for transmission to a network.

Network node 100 may further comprise a standby network port 130a. Such a network port may be used in the event of a failure of the active port 130b and/or to provide link aggregation. Network ports 130a and 130b may comprise any suitable type of ports, such as Gigabit Ethernet ports. Either network port may be used in embodiments of the present disclosure. Any number of client ingress ports, loopback ports, and network ports may be used in other embodiments. Also, traffic may traverse any path within a PIU 102 or any path between PIUs 102.

Figure 3:
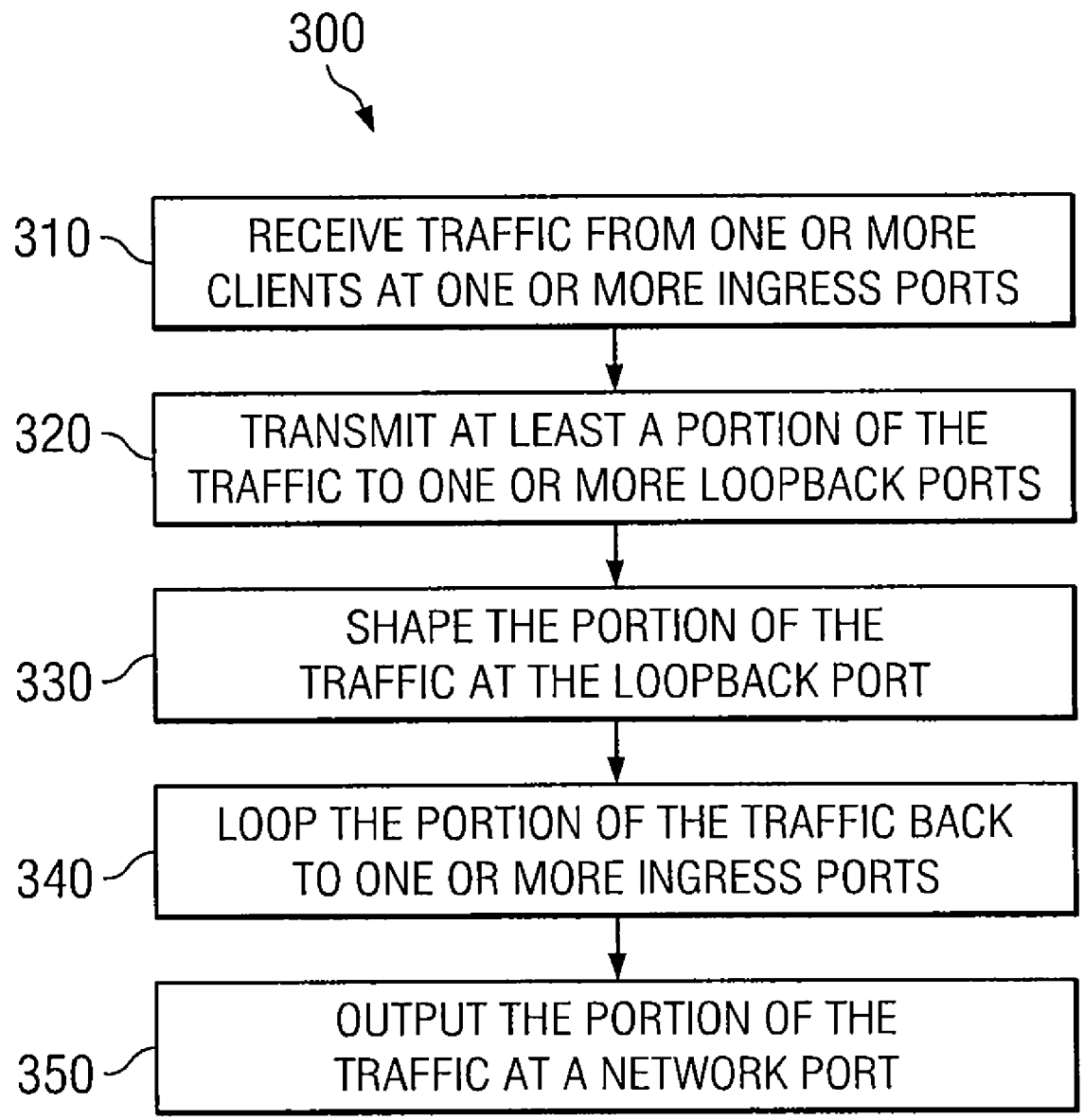
FIG. 3 illustrates an example method for providing traffic shaping via internal loopback of traffic.

FIG. 3 illustrates an example method for providing traffic shaping through internal loopback. The steps illustrated in FIG. 3 may be combined, modified, or deleted where appropriate. Additional steps may also be added to the example operation. Furthermore, the described steps may be performed in any suitable order.

The process begins with step 310, where a device may receive traffic from one or more clients at one or more ingress ports. Any number of clients and any number of ports may be used. The traffic may comprise packet-switched data.

In step 320, traffic is transmitted to one or more loopback ports, which as discussed above, are unused egress ports having associated traffic shaping engines used to shape traffic. Any suitable mechanism may be used to transmit the traffic to the loopback ports. A traffic forwarding engine comprising any suitable hardware and/or software may be used.

In step 330, a portion or all of the traffic may be shaped at the traffic shaping engine associated with loopback port. Traffic shaping may be used to optimize the performance of the system by lowering latency, and/or increasing usable bandwidth. Traffic shaping may also be used to classify traffic into different classes, and prioritize the traffic based at least in part on the classification. Any type of traffic shaping may be performed at the loopback port. In addition, any mechanisms may be used to perform traffic shaping.

At step 340, some or the entire portion of the traffic at the loopback port is looped back through the traffic forwarding engine, for a second pass thru that engine. Each loopback port may serve a single client ingress port, or any other ratio of loopback ports to client ingress ports may be used. Traffic may be looped using internal PHY layer of a device, which loops the egress portion of the loopback port back to the ingress portion of the same port.

At step 350, at least a portion of the shaped traffic is output at a network port. Some traffic shaping or queuing may be performed at the network port in some embodiments. Well-shaped traffic from multiple client ports may be combined at a network port and output. Multiple network ports may also be used in some embodiments.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for traffic shaping, comprising:
receiving traffic from one or more clients at one or more ingress ports of a forwarding engine of a network node;
transmitting at least a portion of the traffic through the forwarding engine to one or more first egress ports of the forwarding engine;
transmitting the traffic from the first egress ports to one or more traffic shaping engines associated with the first egress ports;
shaping the traffic using the traffic shaping engines;
looping the shaped traffic internally within the network node back to one or more ingress ports of the forwarding engine;
transmitting the looped traffic through the forwarding engine to one or more second egress ports, the second egress ports different than the first egress ports; and
outputting the shaped traffic from the network node.

2. The method of claim 1, wherein the traffic shaping engines are part of an unused network port of the network node.

3. The method of claim 1, wherein the one or more traffic shaping engines comprise one or more schedulers.

4. The method of claim 1, further comprising assigning one or more descriptors to the traffic transmitted to one or more egress ports of the network node at each such egress port.

5. The method of claim 1, further comprising assigning a class of service to at least a portion of the traffic.

6. The method of claim 1, wherein looping the shaped traffic internally within the network node comprises looping back the shaped traffic at a PHY layer of the network node.

7. The method of claim 1, wherein each first egress port receives traffic from only one ingress port.

8. The method of claim 1, wherein each first egress port receives traffic from a plurality of ingress ports.

9. The method of claim 1, wherein transmitting at least a portion of the traffic through the forwarding engine to one or more first egress ports of the forwarding engine comprises transmitting traffic from a single ingress port to a plurality of first egress ports of the forwarding engine.

10. The method of claim 1, further comprising:
combining, in the forwarding engine, shaped traffic looped back to different ingress ports of the forwarding engine; and
outputting the combined shaped traffic from the network node.

11. A network node, comprising:
a plurality of ingress ports of a forwarding engine configured to receive traffic from one or more clients coupled to the network node;
one or more first egress ports of the forwarding engine configured to receive at least a portion of the traffic from one or more of the ingress ports;
one or more traffic shaping engines associated with the one or more first egress ports and configured to shape the traffic received from one or more of the ingress ports;
one or more of the ingress ports configured to receive, via an internal loopback within the network node, the shaped traffic from the traffic shaping engines;
the forwarding engine configured to transmit the shaped traffic through the forwarding engine to one or more second egress ports, the second egress ports different than the first egress ports; and
one or more network ports configured to receive the shaped traffic from the one or more second egress ports and to output the shaped traffic to a network.

12. The network node of claim 11, wherein the traffic shaping engines are part of one or more unused network ports of the network node.

13. The network node of claim 11, wherein the one or more traffic shaping engines comprise a scheduler.

14. The network node of claim 11, wherein the one or more egress ports are further configured to assign descriptors to at least a portion of the traffic at the egress port.

15. The network node of claim 11, wherein the one or more traffic shaping engines are further configured to assign a class of service to at least a portion of the traffic received at the associated egress port.

16. The network node of claim 11, wherein each egress port receives traffic from only one ingress port.

17. The network node of claim 11, wherein each egress port receives traffic from a plurality of ingress ports.

18. The network node of claim 11, wherein the forwarding engine is configured to transmit traffic from a single ingress port to a plurality of first egress ports.

19. The network node of claim 11, wherein the forwarding engine is further configured to combine shaped traffic looped back to different ingress ports of the forwarding engine and then to transmit the combined shaped traffic through the forwarding engine to the one or more second egress ports.

* * * * *